United States Patent Office 3,297,593
Patented Jan. 10, 1967

3,297,593
CATION EXCHANGE RESIN FROM AN
ALKYLBENZENE
Carl B. Linn, Riverside, Ill., assignor to Universal Oil Products Company, Des Plaines, Ill., a corporation of Delaware
No Drawing. Filed May 20, 1963, Ser. No. 281,772
9 Claims. (Cl. 260—2.2)

This invention relates to a process for producing an ion exchange resin of the type which is capable of removing cations from aqueous solutions and to the product of such process as a composition of matter. More specifically, this invention relates to a cation exchange resin of the sulfonated aromatic polymer type, the aromatic polymer being formed by the condensation of an alkyl-aromatic hydrocarbon with formaldehyde under conditions which yield a high-melting, solvent-insoluble resin which, when sulfonated, contains approximately one sulfonic acid group for each triarylnuclear unit.

The resinous products of this invention are prepared by sulfonating a resin formed in a preliminary process of synthesis in which an alkylbenzene hydrocarbon containing not more than two nuclear alkyl substituents is mixed with formaldehyde to form a highly crosslinked structrue made of repetitive alkylarylyl

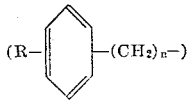

units. When sulofnated, the resulting resin contains one sulfonic acid radical per alkylaryl trimer and yields a product having the desirable properties of a water insoluble ion exchange for use in aqueous systems. Thus, the sulfonated resin has a sufficiently crosslinked structure to be substantially insoluble in aqueous solutions, in spite of the presence of the hydrophilic, polar, sulfo-groups in the structure of the resin molecule. The sulfonated resin which contains a relatively large number of sulfo-groups per unit of molecular weight is sufficiently hydrophilic to permit diffusion of ions through the cross-linked resin structure at a rapid, finite rate. In addition, the cross-linked aromatic structure, containing a minimum of aliphatic radicals, provides a substantially open structure through which the ions to be removed from the aqueous solution readily diffuse and also readily enter the electrical field of attraction provided by the polar sulfo radical attached to the aromatic nucleus; accordingly, the sulfo radicals are readily accessible and provide ion exchange centers which are easily available to the migrating ions in the aqueous solution. Still another desirable characteristic of the present resins, which arises out of their aromatic structure, is their chemical stability under a variety of conditions which would normally tend to hydrolyze a sulfo radical from the structure of the base if the latter were less structurally stable, such as a sulfonated aliphatic chain. Thus, the sulfonated resin when used in an ion-exchange process may be subjected to a variety of reaction conditions of varying severity without loss of its ion exchange capacity, such as high temperature aqueous streams, or to aqueous solutions of strong acids or bases of high concentration without hydrolysis of the sulfo group(s) from the aryl nucleus. The sulfonated resin may also be regenerated repeatedly without undergoing essential change in its composition of structure. The resins are prepared from low cost, readily available articles of commerce and are thus useful for the treatment of aqueous streams in large volume, or use which would otherwise be ruled out if the cost of the water treatment exceeded a low potential value for the treated water.

The resinous starting material which provides the supporting structure on which the repeating sulfo functional groups are attached to form the present ion exchange resin is prepared in a preliminary resin production stage of the process, prior to the sulfonation reaction by means of a process which essentially involves the condensation of formaldehyde with an alkyl aromatic hydrocarbon containing condensable nuclear hydrogen atoms, such as toluene, the condensation reaction being effected at reaction conditions which result in the release of water of condensation and the production of a resin containing only carbon and hydrogen in its chemical composition. In view of the fact that the condensation product does not melt on being heated but, instead, chars to the carbon and hydrogen elemental components in its composition indicates that the aromatic nuclei are cross-linked between methylene groups in an extremely high molecular weight structure. The resin is insoluble in any of a large number of currently available organic or inorganic solvents which commonly dissolve hydrocarbons, retaining the essential aromatic structure of the initial monomer in which the carbon atoms of the aromatic nuclei are bonded together by oscillating double and single bonds.

In one of its embodiments this invention relates to a process for the production of a cation exchange resin which comprises condensing formaldehyde with an alkyl benzene hydrocarbon containing from 1 to 2 nuclear alkyl radicals, each alkyl group containing from 1 to 2 carbon atoms per alkyl group at condensation reaction conditions which form a resinous condensation product of high molecular weight and of hydrocarbon composition and thereafter sulfonating said condensation product at sulfonating reaction conditions sufficient to introduce at least one sulfo radical for every 3 nuclear aryl monomer units in said resinous product.

In the production of the resinous condensation product which forms the structural base on which sulfo groups are substituted to form the present cation exchange resinous product, suitable hydrocarbon starting materials are selected from the mono-nuclear aromatic hydrocarbons containing from 1 to 2 short chain alkyl groups having not more than 3 carbon atoms per alkyl group, including thereby toluene, ethylbenzene, xylene, methylethylbenzene, diethylbenzene and cumene, all of which contain a reactive nuclear hydrogen atom which becomes intrinsically involved in the condensation of the formaldehyde reactant of the present process to form the high molecular weight resinous base structure. The alkyl aromatic hydrocarbon may be a substantially pure individual or may comprise a mixture of two or more of the foregoing alkyl benzene hydrocarbons or a mixture in which may also be present other hydrocarbons of nonreactive character, such as paraffinic and naphthenic hydrocarbons commonly found in admixture with the foregoing alkyl aromatic compounds as fractions of petroleum origin, including the products of certain petroleum conversion reactions. Preferably, however, the aromatic reactant is supplied to the resin-forming reaction mixture as a fraction consisting essentially of aromatic components substantially free of inert diluent hydrocarbons of paraffin or naphthenic types. Thus, a particularly suitable mixture of alkyl aromatic hydrocarbons utilizable as the aromatic starting material in the present process is a benzene-free aromatic extract of a petroleum conversion product, such as the 90 to 180° cut of a hydro-formed naphtha, typically represented, for example, by a fraction boiling within the above range, separated from the products of a Platforming reaction and containing toluene, xylene, ethylbenzene and minor proportions of methylethyl benzene and cumene. Formaldehyde, the reactant involved in the present condensation process which reacts with one of the aforementioned alkylaromatic hydrocarbons to form the resinous structural base is preferably supplied to the condensation reaction in the form of a polymer thereof, referred to as paraformaldehyde, which depolymerizes during the condensation reaction. Although formaldehyde in its polymeric form is preferred in the present process, it is also feasible to utilize a formaldehyde concentrate preferably containing formaldehyde at a concentration of at least 75 percent in the condensation stage of the process. As specified in the description of the present process and as referred to in the claims appended hereto, the term "formaldehyde" is intended to include formaldehyde polymers, such as paraformaldehyde, and aqueous alcoholic concentrates of formaldehyde containing at least 75 percent by weight equivalent of monomeric formaldehyde.

The condensation of the alkyl benzene hydrocarbon with formaldehyde is promoted by a catalytic agent characterized as an acid-acting compound, including generally the Friedel-Crafts metal halides, the mineral acids, boron trifluoride, and a group of catalysts referred to as the "Ansalvo" acids comprising complexes of the foregoing Friedel-Crafts metal halides and boron trifluoride with certain organic compounds, such as the ethers, alcohols and ketones. Of the mineral acids utilizable as catalysts, hydrofluoric acid containing at least 85 percent by weight of hydrogen fluoride, including anhydrous, liquefied hydrogen fluoride, sulfuric acid of at least 80 percent concentration, phosphoric acid and more preferably pyrophosphoric acid are especially preferred. All of the Friedel-Crafts metal halides, the aluminum halides such as aluminum chloride, aluminum bromide and aluminum iodide in their essentially anhydrous form, the zinc halides such as zinc chloride and zinc bromide, and the ferric and stannic halides such as ferric chloride, stannic chloride and stannic bromide, etc., are among the preferred Friedel-Crafts metal halides utilizable as catalysts for the condensation process. The foregoing aluminum halides converted to a so-called "Ansalvo" complex with a dialky ether, a lower dialkyl ketone, an alcohol or a lower molecular weight organic acid constitute another preferred group of catalytic agents for promoting the condensation reaction, including, for example, aluminum chloride triacetate, boron trifluoride etherate (such as the etherate prepared from dimethylether, diethylether, methylethyl ether, etc.) and boron trifluoride alcoholates such as the addition complex of anhydrous boron trifluoride with a lower molecular weight aliphatic alcohol, such as methanol, ethanol, etc.

The catalyst is mixed with the reactants at a rate sufficient to provide a weight ratio of alkyl aromatic hydrocarbon reactant to catalyst of from about 0.5 to 1 to about 10 to 1. Since the condensation product of the formaldehyde with the alkyl aromatic hydrocarbon is a refractory solid, the catalyst is diffused throughout the resinous product, unless removed therefrom by washing the resin with a solvent for the catalyst, such as water.

The condensation of the alkyl aromatic hydrocarbon with formaldehyde is effected in the presence of the catalyst at temperatures of from about −10° to about 100° C. and at pressures sufficient to maintain the reactants and catalyst in essentially non-vaporized form. The formaldehyde is combined with the alkyl aromatic hydrocarbon reactant in the initial resin-forming condensation reaction in proportions sufficient to provide from 2 to 5 moles of alkyl aromatic hydrocarbon per mole of formaldehyde, the resulting reaction involving a condensation between the formaldehyde carbonyl group with a nuclearly active hydrogen atom on the aromatic ring to form water of condensation and a highly cross-linked structure binding the aromatic rings of adjacent alkyl aromatic hydrocarbons across a methylene bridge, as follows:

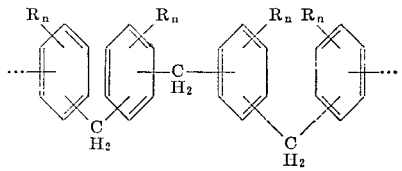

in which n is a whole number having a value of from 1 to 2 and wherein the number of repeating alkylaryl-methylene structure unit in the composition of the resin has an extremely high value in the resulting product, sufficient to produce a refractory, amorphous solid having no melting point and negligible solubility in organic solvents.

The resinous condensation product formed as indicated above is subjected to sulfonation in accordance with the present process to form a cationic exchange resin, utilizing sulfonation reaction conditions and a sulfonating agent which reacts with the aromatic structure to introduce an average of about one sulfo radical for every 3 aromatic rings in the resinous condensation product. Suitable sulfonating agents for this purpose include concentrated sulfuric acid of at least 95 percent by weight $H_2SO_4$, oleum containing up to about 60 percent by weight of free sulfur trioxide, liquefied sulfur trioxide itself, sulfurous chloride and the addition products of sulfur trioxide and aromatic sulfonic acids which may contain up to about 3 moles of sulfur trioxide per mole of sulfonic acid. The sulfonation is effected at temperatures of from about −20° to about 100° C., depending upon the specific sulfonating agent utilized in the reaction. The solid resin is supplied to the reaction in a powdered form, utilizing from 0.3 to 1 to about 1 to 1 moles of sulfonating agent (mole equivalent of free sulfur trioxide) per aromatic nucleus present in the structure of the intermediate resinous condensation product.

The sulfonated resin may be utilized as such as the cation exchange resinous product of this invention or if preferred, the sulfonic acid radicals present in the structure of the resin can be converted to their sulfonate salt derivatives of such bases as the alkali metal hydroxides, ammonia and the amines which form the corresponding alkali metal, ammonium derivative sulfonate salts.

Not only is the intermediate resin (i.e., the resin prior to sulfonation) insoluble in any of the known organic or inorganic solvents, but the sulfonated resin in either its acidic or at least partially neutralized condition is also substantially insoluble in such solvents, a required property of the ultimate product if it is to be useful in the treatment of aqueous streams to remove alkaline earth metals or other metallic ions from water contaminated by such metallic ions. The resulting resinous product is also of high melting point and in most instances does not melt, but, on heating, carbonizes to an amorphous solid. Accordingly, the cationic resin does not lose its sulfo or sulfonate substituents, even at elevated temperature, so that the resin may be utilized in ion exchange reactions at high temperatures (e.g., aqueous streams heated under pressure to temperatures substantially above their boiling points) thereby increasing the rate of treatment and the capacity of the resin.

The present invention is further described in the examples which follow the limits set forth in the examples, however, not being intended to limit the scope of the invention necessarily in accordance therewith.

*Example I*

Into a one liter autoclave equipped with a mechanical stirrer was sealed 50 grams of paraformaldehyde. After cooling to ice temperature, 196 grams of anhydrous hydrogen fluoride was added from a weighed aluminum bomb. Then over a period of 30 minutes, 154 grams of toluene was pressed into the autoclave from a calibrated charger; the temperature of the reactor was kept below 20° C. during this operation.

Thereafter, most of the hydrogen fluoride was swept out of the reaction mixture in a rapid stream of nitrogen; when the autoclave was opened the product was found to be a yellow, slightly fuming, solid which was extracted with water and benzene respectively to give 55 grams of a resin, insoluble in ketones, alcohols, hydrocarbons and mineral acids and remained solid (i.e., unmelted) at a temperature of approximately 400° C.

*Example II*

In a similar experiment the following reactants were contacted together for one hour at 0° to 10° C.:

| | Gm. |
|---|---|
| Paraformaldehyde | 60 |
| Toluene | 430 |
| Hydrogen fluoride | 199 |

After sweeping out the hydrogen fluoride and extracting the residue with water and hydrocarbons there remained, after drying, some 73 grams of a resinous product similar to that obtained in Example I, above. This product did not react with boiling dilute mineral acids; however, when treated for several hours with boiling 70% nitric acid, some nitrogen oxide was evolved and a yellow residue remained; when analyzed the resin was found to contain 3.95% nitrogen.

Ten grams of the original resinous product was placed in a flask with 200 ml. of 96% sulfuric acid and the mixture maintained at a temperature of 85° ±10° C. for 24 hours. Following this treatment, excess acid was washed away with water. The residue was an insoluble, black resin which had ion exchange properties. It was analyzed for sulfur and found to contain about 8% sulfur, by weight. This corresponds to a cross-linked toluene —$CH_2$— structure containing about one —$SO_3H$ group for three $C_8H_8$ units. When a solution of dilute NaCl was added to a neutral aqueous suspension of the subject resin, the solution turned strongly acidic.

I claim as my invention:

1. A process for the production of a cation exchange resin which comprises condensing formaldehyde with an alkyl benzene hydrocarbon containing from 1 to 2 nuclear alkyl radicals, each alkyl group containing from 1 to 2 carbon atoms per alkyl group at condensation reaction conditions which form a resinous condensation product of high molecular weight and of hydrocarbon composition and thereafter sulfonating said condensation product at sulfonating reaction conditions sufficient to introduce at least one sulfo radical for every 3 nuclear aryl monomer units in said resinous product.

2. The process of claim 1 further characterized in that said alkyl benzene hydrocarbon is toluene.

3. The process of claim 1 further characterized in that said condensation reaction is effected in the presence of an acidic catalyst which promotes the resulting condensation reaction.

4. The process of claim 3 further characterized in that said catalyst is a borontrifluoride complex of an organic compound selected from the lower aliphatic ketones, alcohols and ethers.

5. The process of claim 3 further characterized in that said catalyst is hydrofluoric acid containing at least 85 percent by weight of hydrogen fluoride.

6. The process of claim 1 further characterized in that the sulfonic acid formed as a result of said sulfonation reaction is converted to its corresponding alkali metal salt.

7. The cation exchange resin formed by the process of claim 1.

8. The cation exchange resin formed by the process of claim 6.

9. A method of treating an aqueous solution containing an alkaline earth metal ion whereby said ion is removed from the solution which comprises contacting a cation exchange resin with said solution at ion exchange conditions, said cation exchange resin being formed by reacting an alkyl aromatic hydrocarbon having from one to two alkyl groups on the aromatic nucleus, each alkyl group containing from one to two carbon atoms per alkyl group, with formaldehyde to form a resinous condensation product of hydrocarbon composition and therefater reacting the resulting resinous product with a sulfonating agent at sulfonation reaction conditions sufficient to introduce at least one sulfo group for every 3 aryl monomer units and withdrawing from the sulfonated resin a treated water product substantially free of alkaline earth metal ions.

References Cited by the Examiner

UNITED STATES PATENTS

| 2,397,398 | 3/1946 | Badertscher | 260—67 |
| 2,529,602 | 11/1950 | Frohmader | 260—2.2 |
| 2,568,313 | 9/1951 | Woolhouse | 260—67 |
| 3,000,859 | 9/1961 | Mirviss | 260—67 |
| 3,154,466 | 10/1964 | Nothum | 252—353 |

WILLIAM H. SHORT, *Primary Examiner.*

J. C. MARTIN, *Assistant Examiner.*